United States Patent
Paczonay

Patent Number: 5,715,863
Date of Patent: Feb. 10, 1998

[54] TUBE QUICK DISCONNECTOR

[76] Inventor: Joseph R. Paczonay, 3050 Aptos Hill Ln., Aptos, Calif. 95003

[21] Appl. No.: 645,270
[22] Filed: May 13, 1996
[51] Int. Cl.⁶ .............................. F16K 15/00; F16K 17/00
[52] U.S. Cl. ................ 137/512; 137/533; 137/614.21; 251/149.1; 285/345
[58] Field of Search .............................. 137/512, 533.19, 137/533.17, 533, 614.2, 614.21; 251/149.1; 285/345, 110

[56] References Cited

U.S. PATENT DOCUMENTS

| | | | |
|---|---|---|---|
| 3,288,497 | 11/1966 | Nydam | 285/345 |
| 3,550,616 | 12/1970 | Graham | 137/533.19 |
| 3,565,078 | 2/1971 | Vailiancourt et al. | 251/149.1 |
| 3,998,478 | 12/1976 | Zopfi | 285/345 |
| 4,245,635 | 1/1981 | Knotos | 251/149.1 |
| 4,275,907 | 6/1981 | Hunt | 251/149.1 |
| 4,338,933 | 7/1982 | Bayard et al. | 251/149.1 |
| 4,375,864 | 3/1983 | Savage | 251/149.1 |
| 4,387,879 | 6/1983 | Tauschinski | 251/149.1 |
| 4,874,364 | 10/1989 | Morris et al. | 251/149.1 |

Primary Examiner—Denise L. Ferensic
Assistant Examiner—Joanne Kim
Attorney, Agent, or Firm—Thomas R. Lampe

[57] ABSTRACT

A connector for joining two tubes together. A female connector with a cavity made of resilient material such that when the male and female connectors are joined the leakage from the tube ends is minimal. In addition, the cavity made of resilient material resilient will only loosely hold onto the outside surface of the male connector such that the two connectors will disconnect quickly and automatically when a relatively low tensional or shearing force is applied across the joined connector. Valve means are also provided to prevent leakage out of both connectors when the connectors are disconnected.

11 Claims, 9 Drawing Sheets

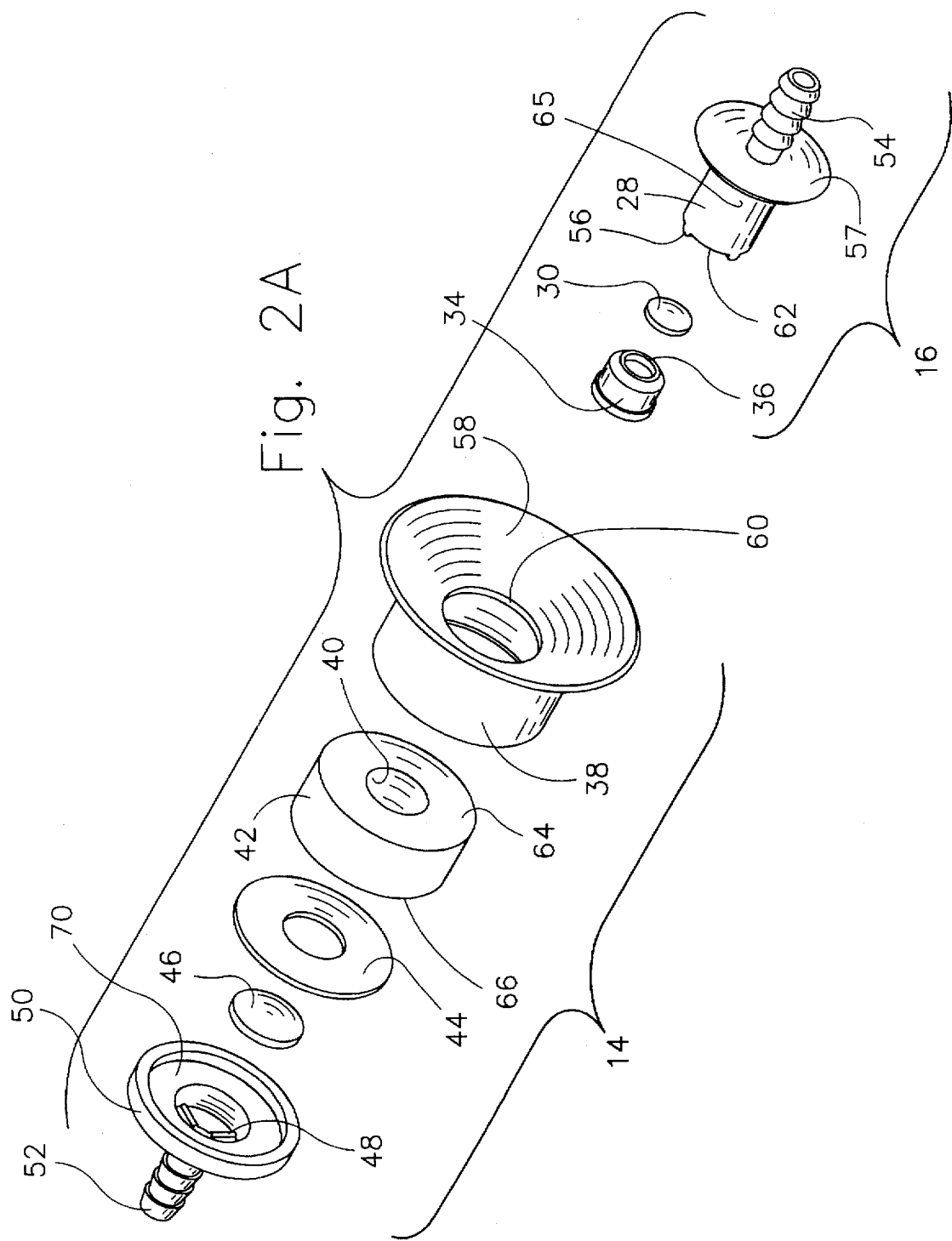

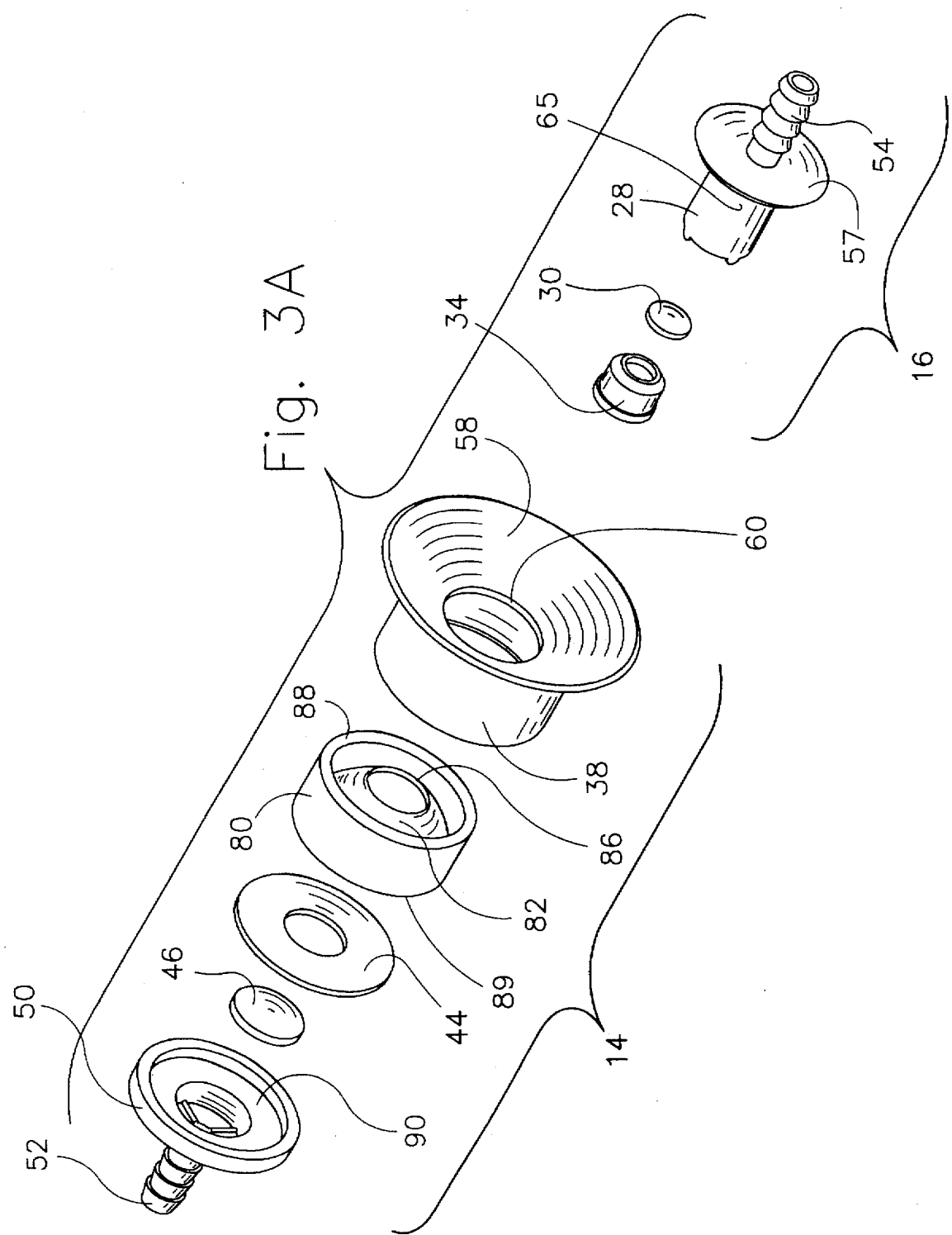

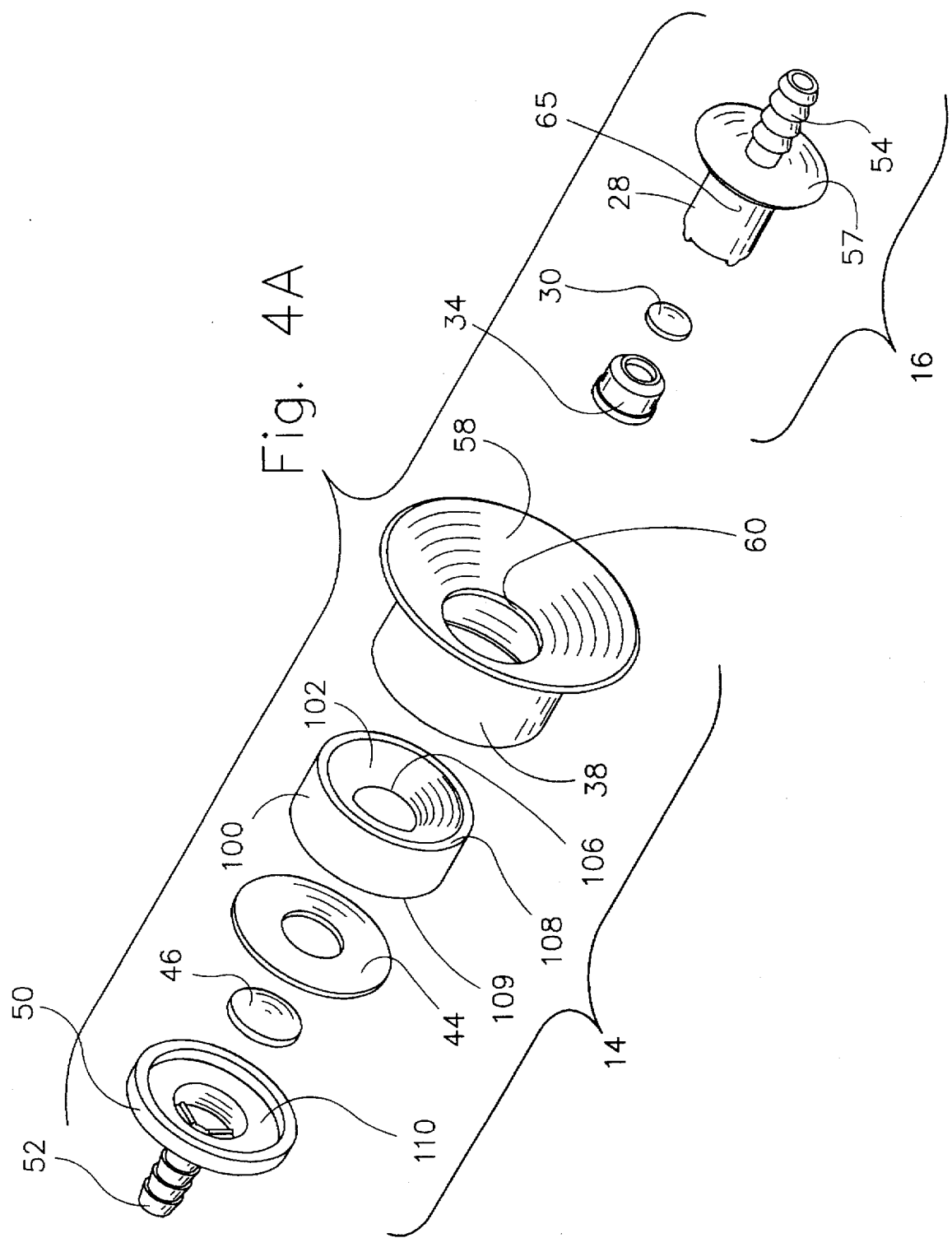

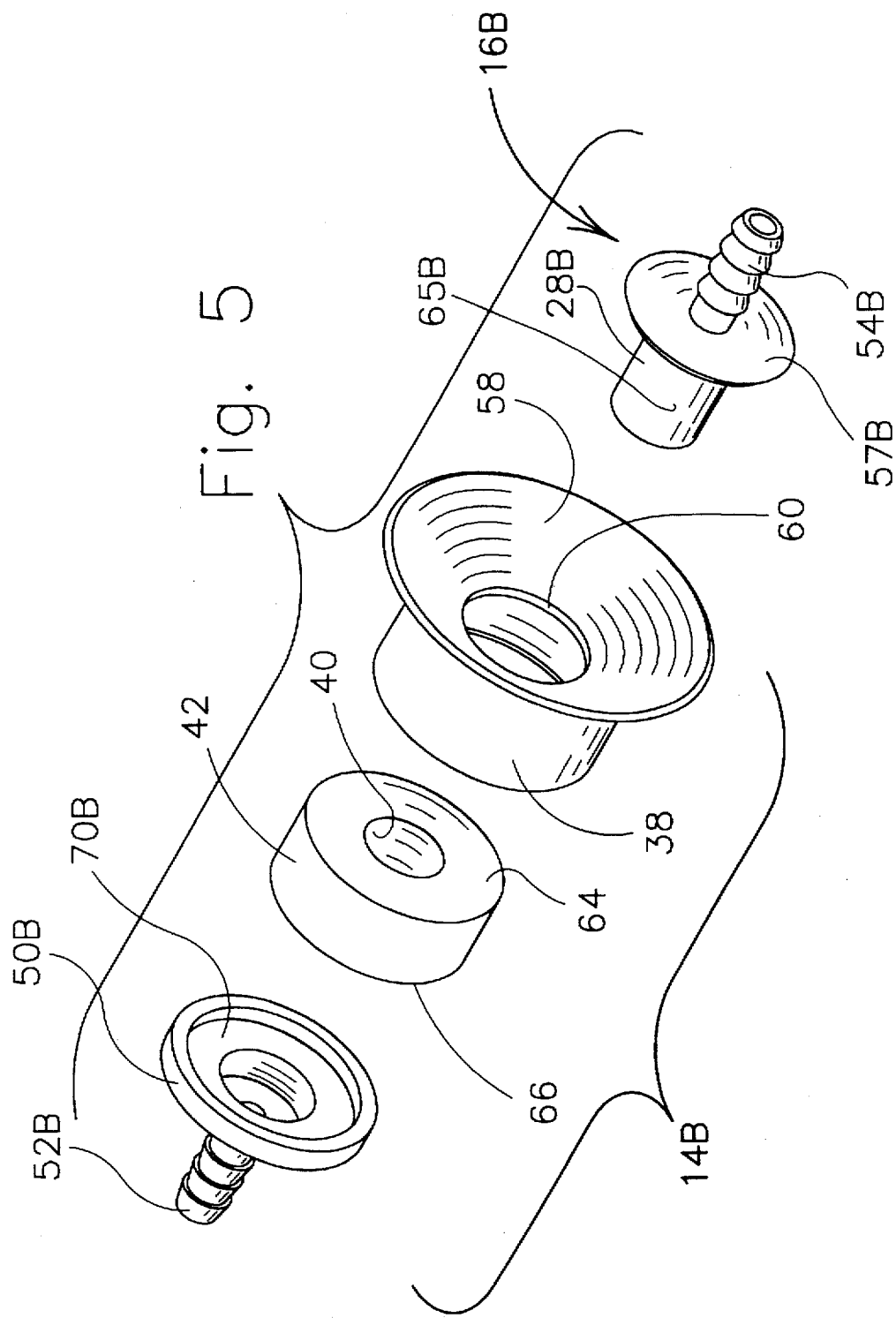

TUBE QUICK DISCONNECTOR

BACKGROUND

1. Field of Invention

The invention is related to tube connectors for fluid delivery. In particular to tube connectors used to deliver fluid with a hydration system for use by humans where the person might want to quickly and automatically disconnect the two tube ends.

2. Discussion of Prior Art

There exist many commercially available tube connectors. Most of these are designed to connect two tubes together and stay locked together. The two tubes can be disconnected by deactivating the locking structure of the tube connector. These connectors are designed for applications that require semi-permanent connection of the tubes and in situations where the fluid in the tubes is under a substantial amount of pressure. These tube connectors prevent instantaneous disconnection.

Other commercially available tube connectors are designed to press the male connector into the female connector. The two parts are held together by the hoop stress applied to the wall of the male connector of the connector when it is wedged into the female connector. The tube can be disconnect only after a substantial amount of tension is applied to pull the two parts back apart. These tube connectors also prevent instantaneous disconnections, unless the applied tension is great enough.

OBJECTS AND ADVANTAGES

Accordingly, several objects and advantages of my invention are a simple inexpensive connector that will connect two tubes together with a leak tight seal. My invention is intended for situations where the tubing may need to be disconnected instantaneously and the contents in the tubing are under a relatively Low pressure. The tubing will stay together under normal low pressure, low tension operating conditions but will disconnect automatically when the tension on the tubing becomes too great.

One particular use for my invention is to connect tubing in fluid drinking systems where the fluid container is removed from the user's body and only a delivery tube is attached to the user. In the event that the user wants to disconnect from the fluid source and any adjoining equipment, my connector invention will disconnect the two tubes from each other by the simple action of pulling on the tubing attached to the user.

Further objects and advantages of my invention will become apparent from a consideration of the drawings and ensuing description.

BRIEF DESCRIPTION OF DRAWINGS

FIG. 2A is an exploded perspective view of my invention for a tube quick disconnector where the male connector is held into the female connector by a resilient annular structure.

FIG. 3A is an exploded perspective view of a second embodiment of my invention for a tube quick disconnector where the male connector is held into the female connector by a resilient cylindrical structure with a domed diaphragm that has a circular cavity for receiving the male connector of the connector.

FIG. 4A is an exploded perspective view of a third embodiment of my invention for a tube quick disconnector where the male connector is held into the female connector by a resilient cylindrical structure with a curved tubular section for receiving the male connector of the connector.

FIG. 5 as an exploded perspective view of the same embodiment as FIG. 2 without any valves.

SUMMARY OF THE INVENTION

This invention is a tube connector for joining two tubes together with a leak tight seal. The two parts of the tube connector will disconnect automatically when a relatively low tensional or shearing force is applied to either part of the tube connector.

DESCRIPTION OF INVENTION

Figure 1:
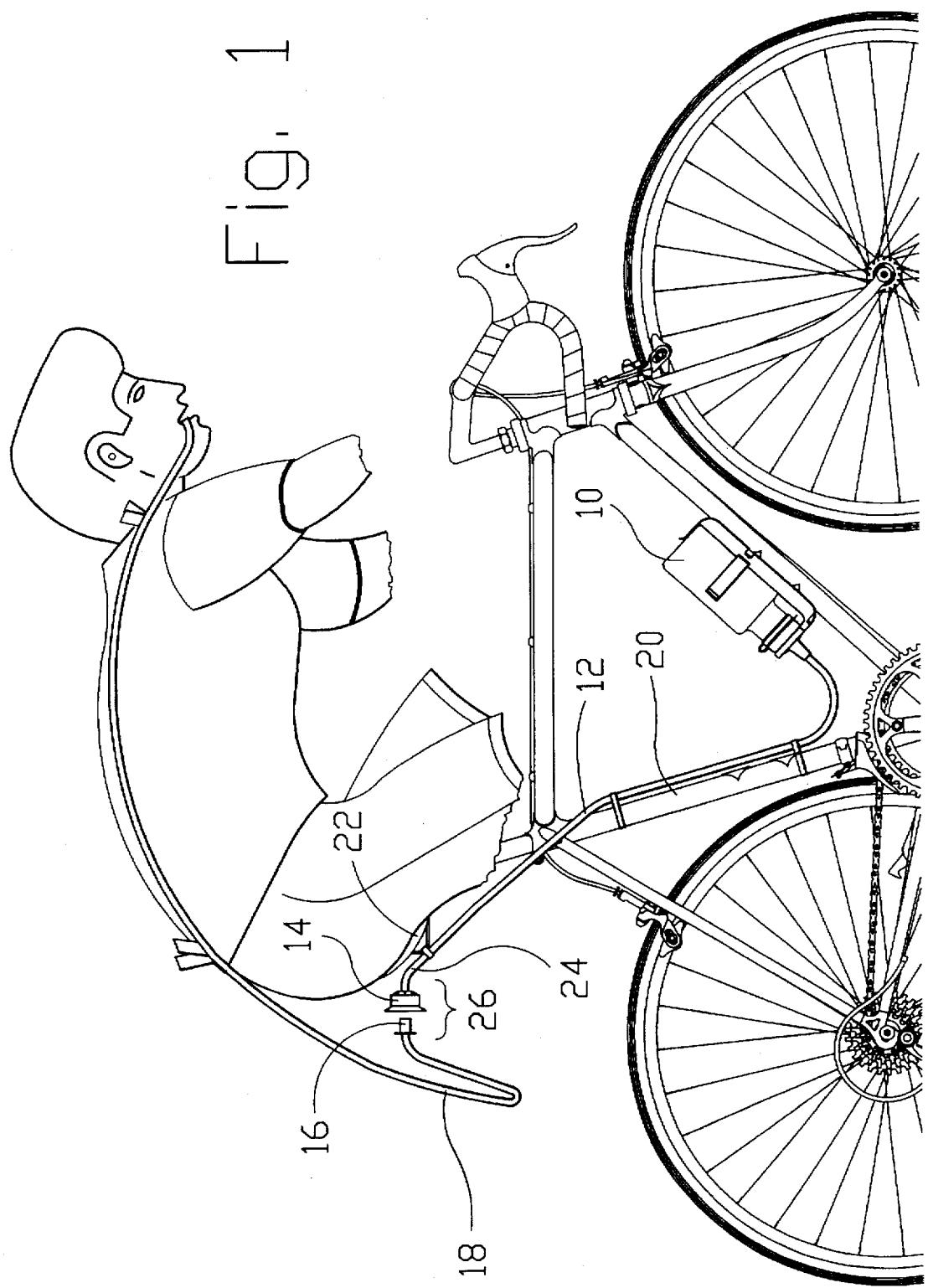
FIG. 1 is a side view of one general application of my invention as a part of a drinking system on a bicyclist where the two parts of the tube connector are disconnected.

FIG. 1 illustrates the tube connector constructed in accordance with the teachings of the present invention being utilized by the rider of a bicycle. A liquid container 10 is carried on a bicycle 20. A liquid delivery tube 12 projects from container 10 up the bicycle 20 to the rear of seat 22. The liquid delivery tube 12 is connected to the rear of the seat 22 as shown. A relatively short length of delivery tubing 24 is allowed to hang off the seat 22. Female connector 14 of tube connector 26 is attached to the end of the short tenth of tubing 24. A second delivery tube 18 is attached to the cyclist's back. Male connector 16 of tube connector 26 is attached to the end of the second tube 18. When the two parts of the connector 26 are joined together, the liquid can flow up to the cyclist's mouth. If the cyclist dismounts, the male connector 16 will automatically pull apart from the female connector 14.

Referring now to FIGS. 2A, 2B, 2C, and 2D, the male connector 16 is made up of a valve housing 28 into which one way valve disc 30 is held in place by the valve insert 34. Disc 30 sits in the void made when insert 34 is pressed into valve housing 28. In this embodiment the one way valve is a gravity type valve. The face 36 of insert 34 can be the sealing seat of the one way valve and the male connector porous seat 72 can be an internal structure of the valve housing 28 or the face 36 of insert 34 can be the porous seat of the one way valve mad the male connector sealing seat 72 can be an internal structure of the valve housing 28.

The female connector 14 consist of a cylindrical housing 38 that holds a resilient annular disc 42, next to an annular sealing disc 44 and a female valve disc 46. A barbed housing 50 presses all the parts of the female connector 14 together. A leak tight seal is made between the flat surfaces 66, 64 of the annular disc and the surfaces of the internal surface 68 of cylindrical housing 38 and internal surface 70 of barbed housing 50. Disc 46 is allowed to flip back and forth in the void made between annular sealing disc 44 and a female connector porous seat 48 of the barbed housing 50. The valve in the female connector 14 is opened when the male connector 16 is pressed through the hole of the annular sealing seat 44. Bumps 56 on the tip of the male connector 16 push the female valve disc 46 away from the annular sealing seat 44 and up against the porous seat 48. In this position the fluid can easily flow around the void between the bumps 56 and the void between the female connector porous seat 48. When the male connector 16 is removed the hydrostatic head of the fluid in the tubing presses the disc 46 up against the annular sealing seat 44.

Barbs 52, 54 attach tubing 24 is, respectively, to the female connector 14 and the male part 16.

Conical surface 58 of the cylindrical housing 38 helps guide the male connector 16 into hole 60 of the female connector 14. Halo part 57 of the male connector 16 aids in pressing the two parts of the tube connector together. When the two parts are connected, halo part 57 also prevents any debris from falling onto the annular disc 42.

The diameter of annulus hole 40 is smaller than outside diameter 62 of the male part 16. So that when the male connector 16 is pressed into the cylindrical housing 38 of the female connector 14, a leak tight seal is made between the inside of the annulus hole 40 and the outside surface of the male connector 16. Since the annular disc is made of resilient material such as silicone sponge rubber, the smaller size of the annulus hole 40 compresses snugly around outside surface 65 of the male connector 16 holding the two parts of the tube connector together.

Figure 2B:
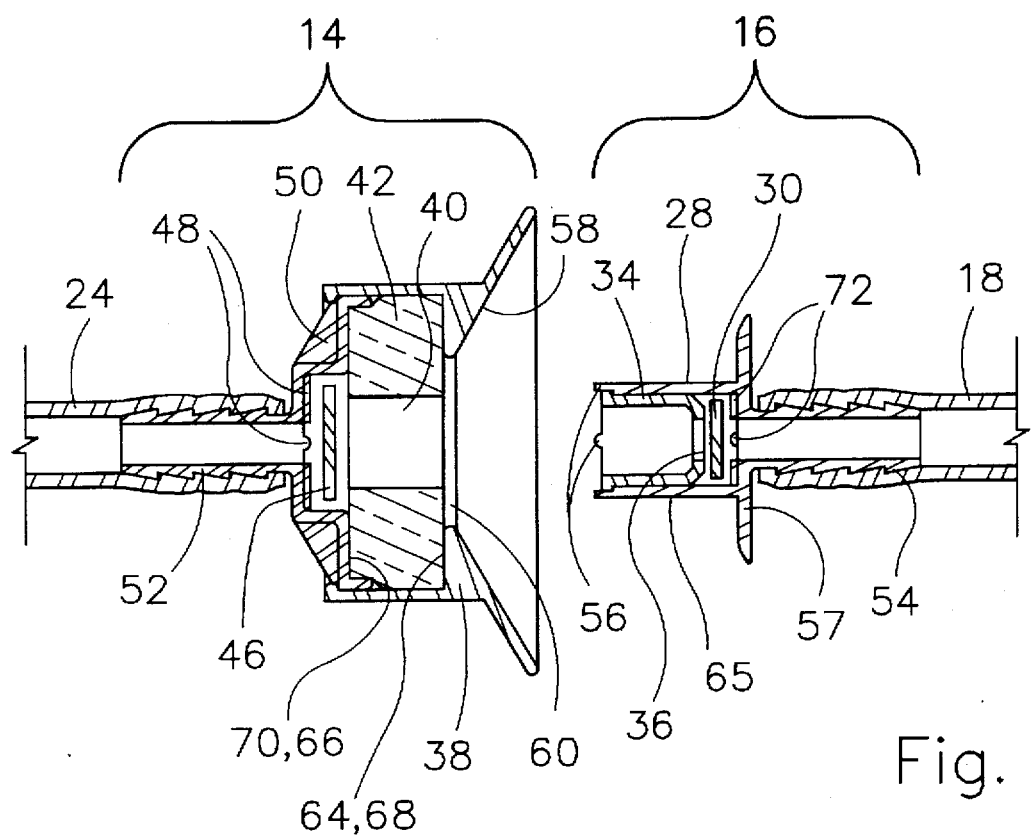
FIG. 2B is a cross-sectional view office embodiment shown is FIG. 2A where two parts of the tube connector are disconnected.
Figure 2C:
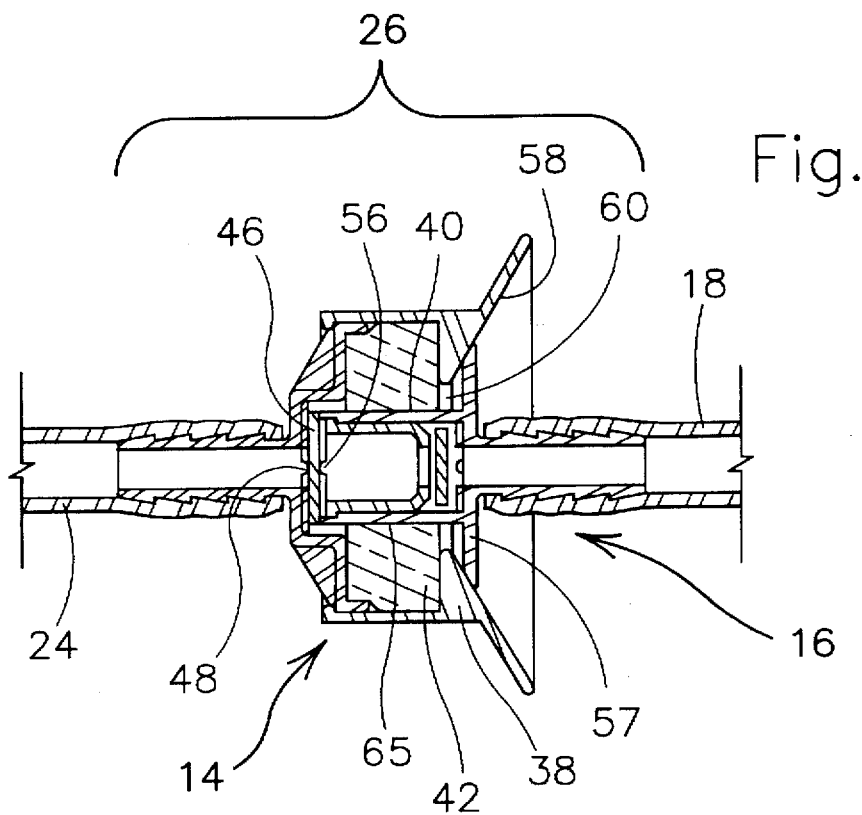
FIG. 2C in a cross-sectional view of the embodiment shown in FIG. 2A where two parts of the tube connector are joined.
Figure 2D:
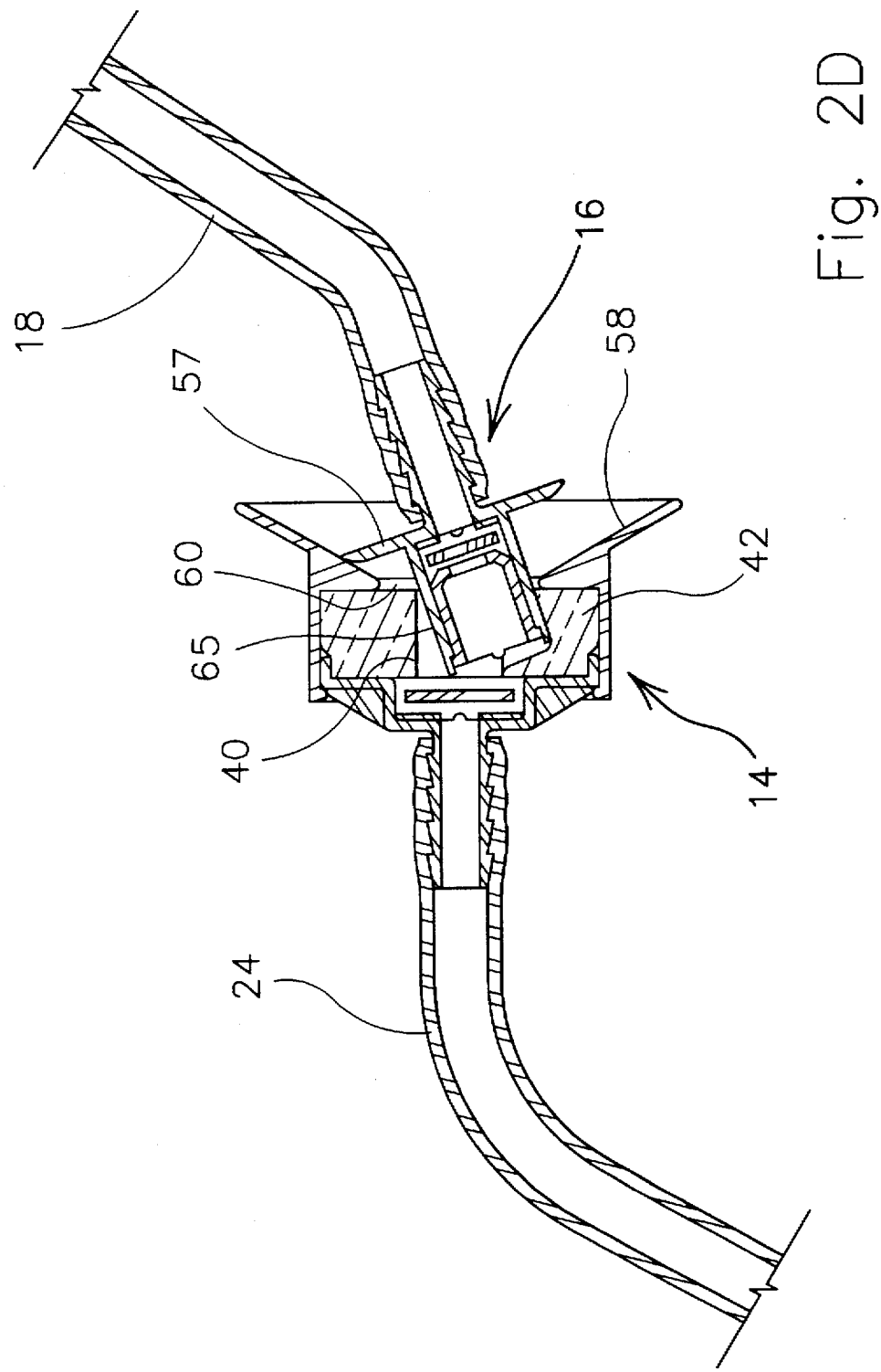
FIG. 2D in a cross-sectional view of the embodiment shown in FIG. 2A where two parts of the tube connector are joined but a shearing force is being applied to detach the two parts.

When the two parts are connected and a tensional force is applied to the tubes on the barbs 52, 54, the compressive forces of the annular disc 42 onto the outside surface 65 of the male connector 16 are easily over come and the two parts of the tube connector disconnect. Ira shearing force is applied to the connected parts, the male connector 16 can rotate around the tip of halo part 57 out of the female connector 14 as shown in FIG. 2D. Since both connectors are attached to flexible tubing, the shearing force will be translated into a tensional force and the parts will easily pull apart. The valves in both parts of the tube connector prevent fluid from escaping from the tubes.

Figure 3B:
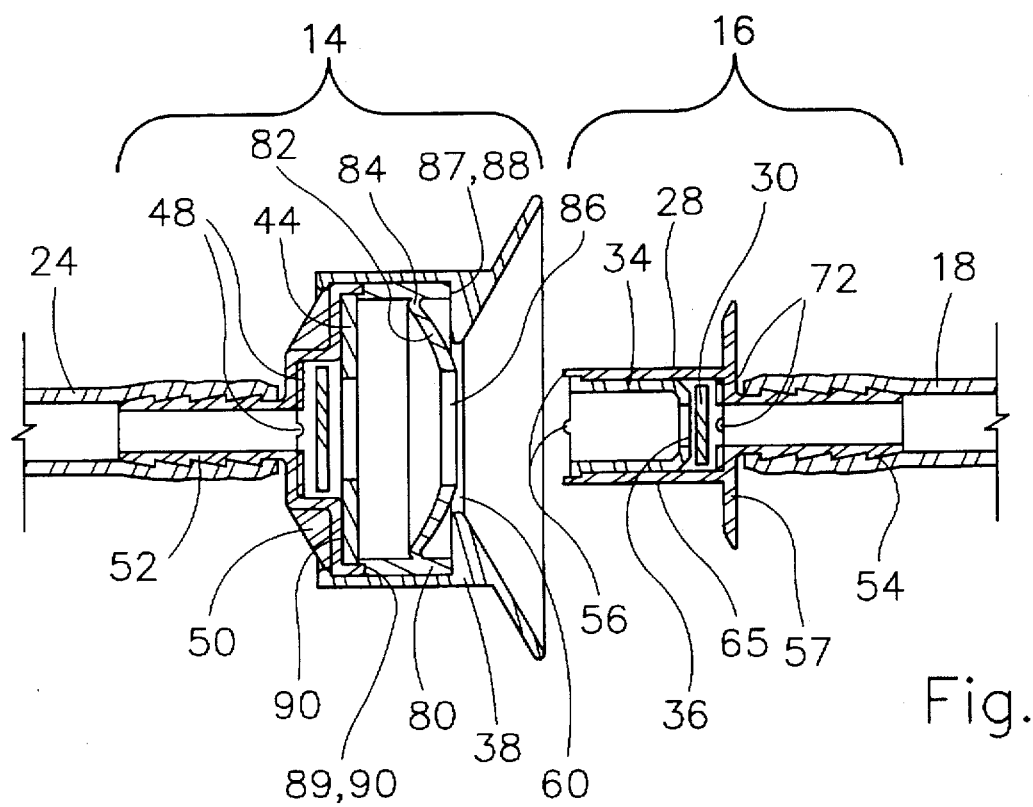
FIG. 3B in a cross-sectional view of the embodiment shown in FIG. 3A where two parts of the tube connector are disconnected.
Figure 3C:
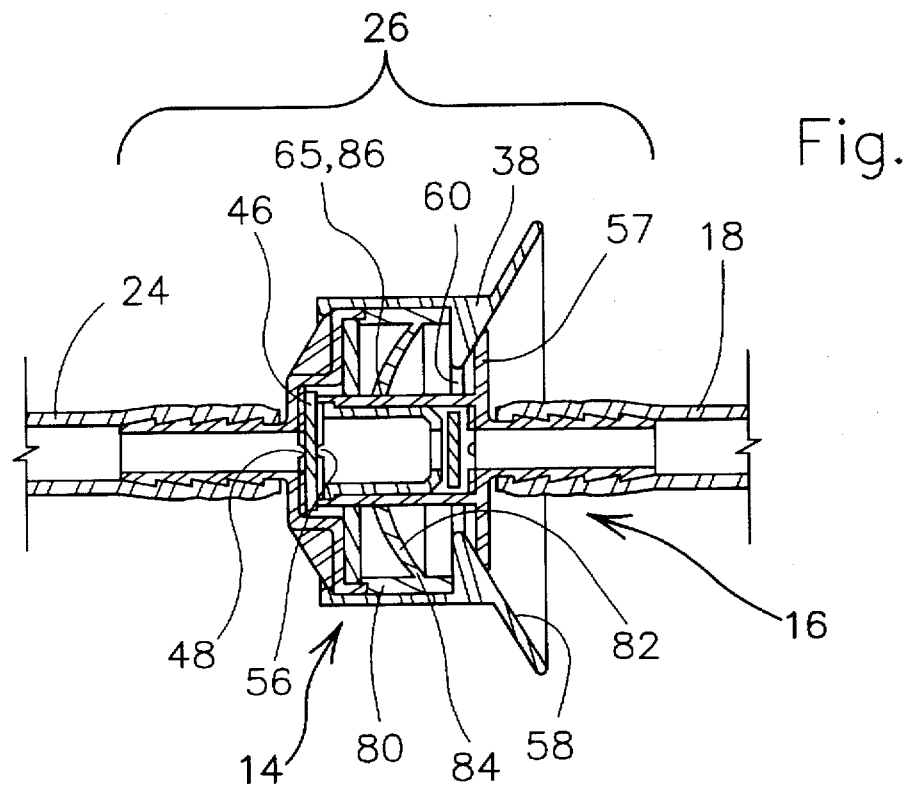
FIG. 3C in a cross-sectional view of the embodiment shown in FIG. 3A where two parts of the tube connector are joined.

FIGS. 3A, 3B, and 3C illustrate another embodiment of the current invention in which all parts and functions are the same as in FIGS. 2A through 2D except the annular disc 42 of the female connector 14 is replaced with a cylindrical resilient member 80 with a internal curved diaphragm 82. A hole 86 in the diaphragm 82 is the sealing and gripping surface for receiving the male connector 16. The diaphragm hole 86 is slightly smaller in diameter than the outside surface 65 of the male connector 16. The cylindrical resilient member 80 has the curved diaphragm 82 built-in. The structure of the cylindrical member 80 and attached diaphragm 82 is such that the diaphragm has two stable positions.

The position in FIG. 3B is the nonstressed position. In this position the hinge portion 84 makes an angle with respect to the diaphragm 82. When the male connector 16 is pressed into the female connector 14, the smaller diameter hole 86 grabs onto the outside surface 65 of the male connector 16. The diaphragm 82 is forced to flex through an unstable structure as the male connector 16 is pressed down to meet the barb housing 50 of the female connector 14. When the male connector 16 is pressed all the way into the female connector 14 as shown in FIG. 3C, the diaphragm 82 will be flexed into the second stable position. In this position, the surface of the diaphragm 82 will come inline with hinge 84 and the hoop stress provided by the prestress shape of the hinge 84 and the diaphragm 82, will keep the diaphragm 82 in the second position. When a tensional force is applied to the tubes 24, is attached to the barbs 52, 54, the diaphragm 82 will be brought back out to the first stable position.

When the male connector 16 is fully inserted into the female connector 14, the diaphragm hole 86 will make a leak tight seal with the outside surface 65 of male connector 16. The flat surfaces 89, 88 of the cylindrical part of the resilient cylindrical member 80 make leak tight seals with the surfaces 90 and 87 of female connector 14.

Figure 4B:
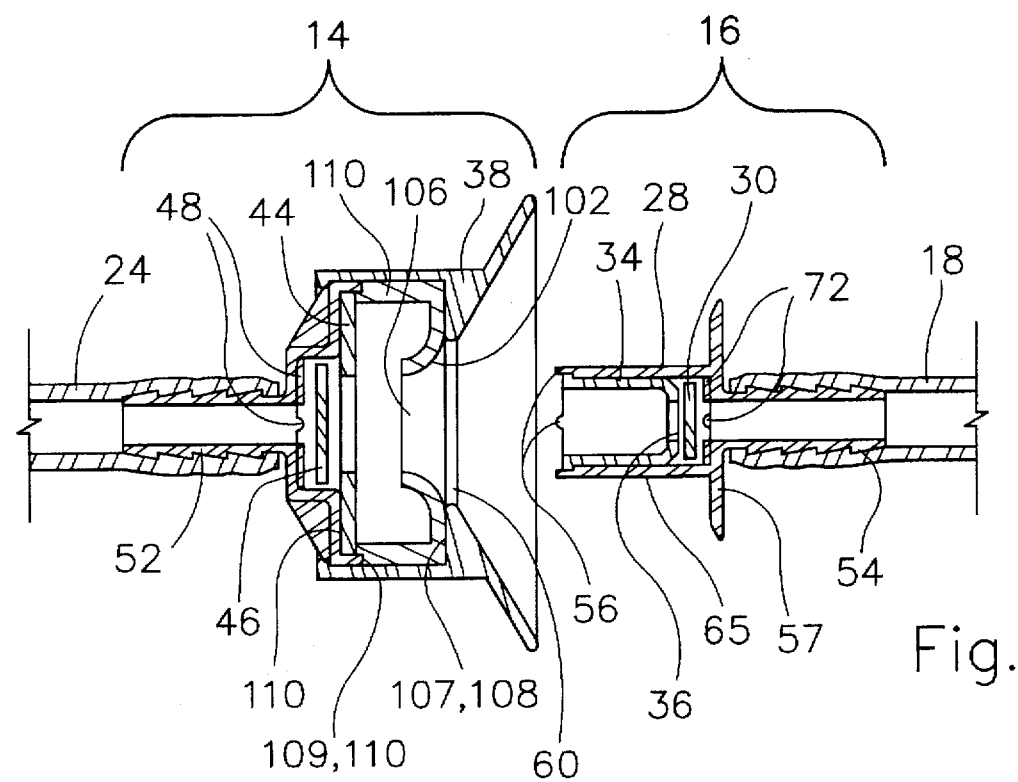
FIG. 4B in a cross-sectional view of the embodiment shown in FIG. 4A where two parts of the tube connector are disconnected.
Figure 4C:
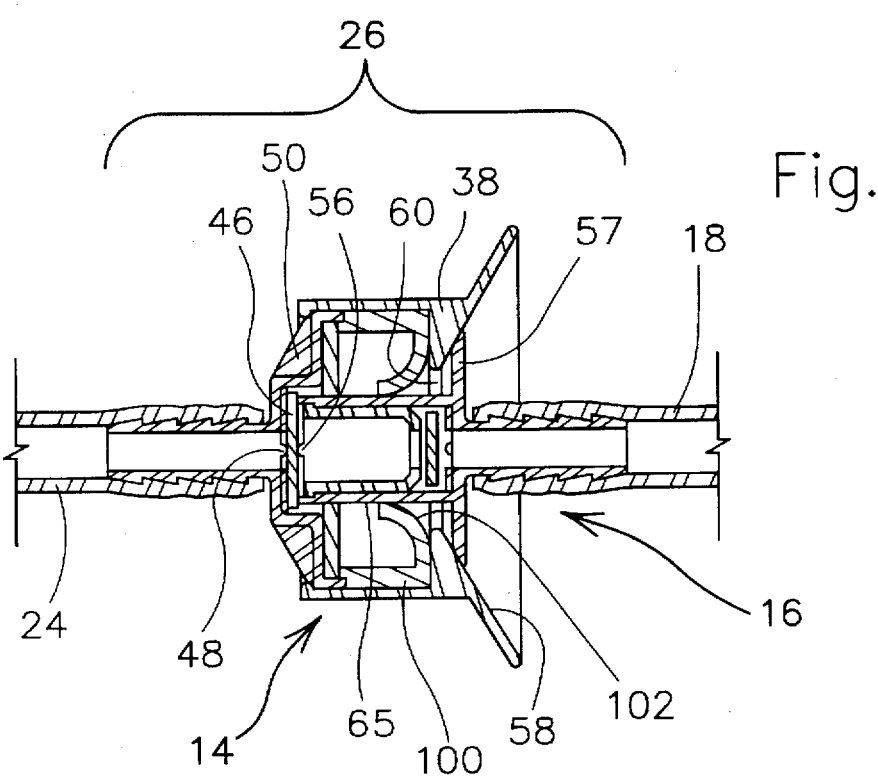
FIG. 4C in a cross-sectional view of the embodiment shown in FIG. 4A where two parts of the tube connector are joined.

FIGS. 4A, 4B, and 4C illustrate one more embodiment of the current invention in which all parts and functions are the same as in FIGS. 2A through 2D except the annular disc 42 of the female connector 14 is replaced with a second cylindrical resilient member 100 with a internal curved tube section 102. A tubular hole 106 in the curved tube section 102 is the sealing and gripping surface for receiving the male connector 16. The curved tube section hole 106 is slightly smaller in diameter than the outside surface 65 of the male connector 16. The second cylindrical resilient member 100 has the curved tube section 102 built-in.

When the male connector 16 is pressed into the female connector 14, the smaller diameter tubular hole 106 grabs onto the outside surface 65 of the male connector 16. When the male connector 16 is fully inserted into the female connector 14, the curve tube hole 106 will make a leak tight seal with the outside surface of male connector 16. The flat surfaces 109, 108 of the cylindrical part of the second resilient cylindrical member 100 make leak tight seals with the surfaces 110 and 107 of female connector 14.

FIGS. 5 illustrates an additional embodiment of the current invention in which all the one way valves are removed All other parts and functions are the same as in FIGS. 2A through 2D.

I claim:

1. Connector apparatus for releasably joining two fluid conduits together to establish fluid-flow communication between said fluid conduits, said connector apparatus comprising, in combination:

a female connector including a female connector housing having a substantially fluid-tight outer peripheral wall defining a female connector housing interior, a female connector inlet communicating with said female connector housing interior, and a female connector outlet spaced from said female connector inlet and communicating with said female connector housing interior, first fluid conduit attachment means connected to said female connector housing for attaching said female connector to a first fluid conduit, and a deformable resilient member connected to and located within said female connector housing interior within the confines of said substantially fluid-tight outer peripheral wall and defining an opening spaced from said substantially fluid-tight outer peripheral wall between said female connector inlet and said female connector outlet; and a male connector including a male connector housing having a male connector substantially fluid-tight outer peripheral wall defining a male connector housing interior, a male connector inlet communicating with said male connector housing interior, and a male connector outlet communicating with said male connector housing interior and spaced from said male connector inlet, and second fluid conduit attachment means connected to said male connector housing for attaching said male connector to a second fluid conduit, said male connector being positionable through said female connector inlet into said female connector housing interior and into the opening of said deformable resilient member to allow flow of fluid through said connector apparatus, said deformable resilient member frictionally engaging the outer peripheral wall of said male connector housing to form a substantially fluid-tight seal therebetween and to connect said female connector and said male connector, said male connector housing being spaced from the substantially fluid-tight outer peripheral wall of said female connector housing by said deformable resilient member when said male connector is in said opening, and said male connector being readily movable relative to the female connector housing and removable from said opening to disconnect said female connector and said male connector upon application of a pulling force to said male connector of sufficient magnitude to overcome the frictional force applied to said male connector by said deformable resilient member.

2. The connector apparatus according to claim 1 wherein said deformable resilient member is generally annular-shaped and includes a cylindrical inner wall defining said opening.

3. The connector apparatus according to claim 1 wherein said deformable resilient member comprises a curved flexible diaphragm extending inwardly from the fluid-tight outer peripheral wall of said female connector housing and movable by said male connector between a first position wherein said diaphragm is convex in the direction of said female connector inlet and a second position wherein said diaphragm is concave in the direction of said female connector inlet, said diaphragm, when in said second position, gripping said male connector to connect said male connector and said female connector.

4. The connector apparatus according to claim 3 wherein said curved flexible diaphragm has an outer periphery hingedly connected relative to the substantially fluid-tight outer peripheral wall of said female connector.

5. The connector apparatus according to claim 1 wherein said male connector is laterally pivotally movable relative to said female connector when said male connector is positioned in the opening of said deformable resilient member.

6. The connector apparatus according to claim 1 additionally comprising a fluid flow control valve in either said female connector or said male connector.

7. The connector apparatus according to claim 6 wherein said fluid flow control valve is in said female connector, said male connector engageable with the fluid flow control valve in said female connector when said male connector is positioned in the opening of said deformable resilient member to open the fluid flow control valve in said female connector.

8. The connector apparatus according to claim 3 wherein said male connector is engageable with said diaphragm to pull said diaphragm from said second position to said first position when a pulling force is exerted on said male connector.

9. The connector apparatus according to claim 1 wherein said deformable resilient member is generally annular-shaped and includes a flexible, curved tubular portion defining said opening.

10. The connector apparatus according to claim 9 wherein said deformable resilient member additionally includes a cylindrical portion adjacent to the substantially fluid-tight outer peripheral wall of said female connector housing and spaced outwardly from said flexible, curved tubular portion.

11. The connector apparatus according to claim 4 wherein said deformable resilient member additionally comprises a cylindrical portion positioned adjacent to the substantially fluid-tight outer peripheral wall of said female connector, said curved flexible diaphragm being hingedly connected to said cylindrical member.

* * * * *

UNITED STATES PATENT AND TRADEMARK OFFICE
CERTIFICATE OF CORRECTION

PATENT NO. : 5,715,863

DATED : February 10, 1998

INVENTOR(S) : Joseph R. Paczonay

It is certified that error appears in the above-identified patent and that said Letters Patent is hereby corrected as shown below:

```
Col. 1, line 37, change "Low" to --low--.
Col. 1, line 62, change "office" to --of the--.
Col. 1, line 65, change "in" to --is--.
Col. 2, line 1, change "in" to --is--.
Col. 2, line 11, change "in" to --is--.
Col. 2, line 15, change "in" to --is--.
Col. 2, line 23, change "in" to --is--.
Col. 2, line 26, change "in" to --is--.
Col. 2, line 29, change "as" to --is--.
Col. 2, line 49, change "tenth" to --length--.
Col. 2, line 66, change "mad" to --and--.
Col. 3, line 21, change "24 is" to --24, 18--.
Col. 3, line 44, change "Ira" to --If a--.
```

Signed and Sealed this

Second Day of June, 1998

Attest:

BRUCE LEHMAN

*Attesting Officer*     *Commissioner of Patents and Trademarks*